United States Patent
Kim

(10) Patent No.: US 11,420,515 B2
(45) Date of Patent: Aug. 23, 2022

(54) VENTILATION FLOW RATE REGULATOR FOR A PRESSURIZED VEHICLE TANK

(71) Applicant: Plastic Omnium Advanced Innovation and Research, Brussels (BE)

(72) Inventor: Tae-Gwon Kim, Troy, MI (US)

(73) Assignee: Plastic Omnium Advanced Innovation and Research, Brussels (BE)

( * ) Notice: Subject to any disclaimer, the term of this patent is extended or adjusted under 35 U.S.C. 154(b) by 55 days.

(21) Appl. No.: 16/609,829

(22) PCT Filed: Jun. 28, 2018

(86) PCT No.: PCT/EP2018/067442
§ 371 (c)(1),
(2) Date: Oct. 31, 2019

(87) PCT Pub. No.: WO2019/002480
PCT Pub. Date: Jan. 3, 2019

(65) Prior Publication Data
US 2020/0114755 A1    Apr. 16, 2020

Related U.S. Application Data

(60) Provisional application No. 62/526,740, filed on Jun. 29, 2017.

(51) Int. Cl.
  *B60K 15/035*   (2006.01)
  *F15D 1/02*     (2006.01)
  (Continued)

(52) U.S. Cl.
  CPC ........ *B60K 15/03519* (2013.01); *F15D 1/025* (2013.01); *B60K 2015/03296* (2013.01);
  (Continued)

(58) Field of Classification Search
  CPC .......... B60K 2015/03576; B60K 2015/03523; B60K 15/03519; F15D 1/025;
  (Continued)

(56) References Cited

U.S. PATENT DOCUMENTS 501,437 A * 7/1893 Pierce ..................... F16K 47/10
                                                137/513.3
2,344,818 A * 3/1944 Hutton .................... F16K 15/10
                                                137/512.1
(Continued)

FOREIGN PATENT DOCUMENTS

| EP | 0 485 335 A1 | 5/1992 |
| EP | 2 665 913 A2 | 11/2013 |
| WO | WO 01/90611 A2 | 11/2001 |

OTHER PUBLICATIONS

International Search Report and Written Opinion dated Nov. 13, 2018 in PCT/EP2018/067442 filed on Jun. 28, 2018.

*Primary Examiner* — Craig J Price
(74) *Attorney, Agent, or Firm* — Oblon, McClelland, Maier & Neustadt, L.L.P.

(57) ABSTRACT

The invention relates to a ventilation flow rate regulator (1) for a pressurized vehicle tank (4), which comprises a plunger (10) adapted to be mounted in a ventilation line (7). The plunger (10) has at least one peripheral orifice (111) and at least one non-central internal orifice (112) which is closer to an axis of symmetry (A) of the plunger (10 than the peripheral orifice (111). The non-central internal orifice (112) has a section perpendicular to the axis of symmetry (A) which is smaller than any section of the peripheral orifice (111) perpendicular to the axis of symmetry (A).

13 Claims, 3 Drawing Sheets

Sectional View According to A-A

(51) Int. Cl.
 *B60K 15/03* (2006.01)
 *F16K 17/30* (2006.01)
(52) U.S. Cl.
 CPC ............... *B60K 2015/03523* (2013.01); *B60K 2015/03576* (2013.01); *F16K 17/30* (2013.01)
(58) Field of Classification Search
 CPC .... G05D 7/0126; G05D 7/0133; F16K 17/30; F16K 17/34; Y10T 137/7869; Y10T 137/7847
 USPC ... 137/504, 513.3, 513.5, 517, 512.5, 512.1; 138/26, 30, 31, 40, 44, 45
 See application file for complete search history.

(56) References Cited

U.S. PATENT DOCUMENTS

| | | | | |
|---|---|---|---|---|
| 2,865,397 | A * | 12/1958 | Chenault | F16K 17/30 137/504 |
| 3,050,086 | A * | 8/1962 | Honsinger | G05D 7/012 138/45 |
| 3,130,747 | A * | 4/1964 | Benaway | G05D 7/0133 137/504 |
| 3,131,716 | A * | 5/1964 | Griswold | G01P 13/0013 137/503 |
| 5,634,491 | A * | 6/1997 | Benedict | E03C 1/08 137/504 |
| 5,727,546 | A * | 3/1998 | Clarke | A61M 15/0028 128/203.15 |
| 6,397,884 | B1 * | 6/2002 | Miyajima | F02M 25/0872 137/543.23 |
| 7,222,637 | B2 * | 5/2007 | Miyajima | F16K 15/026 137/513.3 |
| 7,428,914 | B2 * | 9/2008 | Kaneko | F16K 24/04 123/516 |
| 7,552,745 | B2 * | 6/2009 | Nishiyama | F16L 37/40 137/540 |
| 7,726,344 | B2 * | 6/2010 | Knapp | G05D 7/0133 138/31 |
| 7,806,135 | B2 * | 10/2010 | Kaneko | F16K 31/1635 137/202 |
| 8,726,932 | B2 * | 5/2014 | Matsubara | F16K 15/026 137/515.5 |
| 9,091,429 | B2 * | 7/2015 | Wepfer | F16K 17/30 |
| 9,410,635 | B2 * | 8/2016 | Akimoto | F02M 25/089 |
| 9,410,653 | B2 * | 8/2016 | Bosio | G05D 7/012 |
| 9,435,236 | B2 * | 9/2016 | Zitarosa | F16K 17/044 |
| 9,937,785 | B2 * | 4/2018 | Shimokawa | B60K 15/03519 |
| 2002/0185181 | A1 | 12/2002 | Weldon et al. | |
| 2003/0140970 | A1 * | 7/2003 | Benjey | B60K 15/03504 137/587 |
| 2003/0221675 | A1 * | 12/2003 | Washeleski | F02M 25/089 123/497 |
| 2004/0084081 | A1 * | 5/2004 | Liu | G05D 11/132 137/113 |
| 2011/0240145 | A1 | 10/2011 | Pifer | |
| 2015/0059711 | A1 | 3/2015 | Kishi | |
| 2015/0285394 | A1 * | 10/2015 | Akimoto | F16K 17/26 137/504 |
| 2016/0025238 | A1 | 1/2016 | Miura | |
| 2016/0129779 | A1 | 5/2016 | Shimokawa | |
| 2018/0038320 | A1 * | 2/2018 | Waples | B60K 15/03519 |
| 2019/0168607 | A1 * | 6/2019 | Thebault | F16K 24/04 |

\* cited by examiner

Fig. 5A Top View
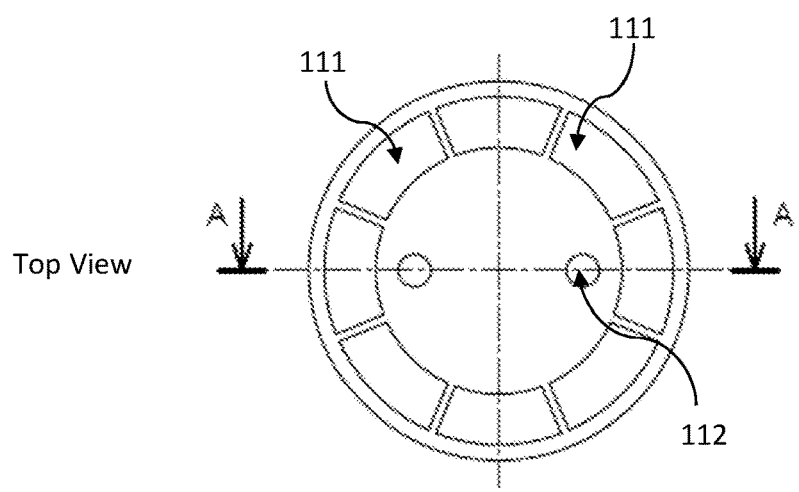
Fig. 5B Sectional View According to A-A
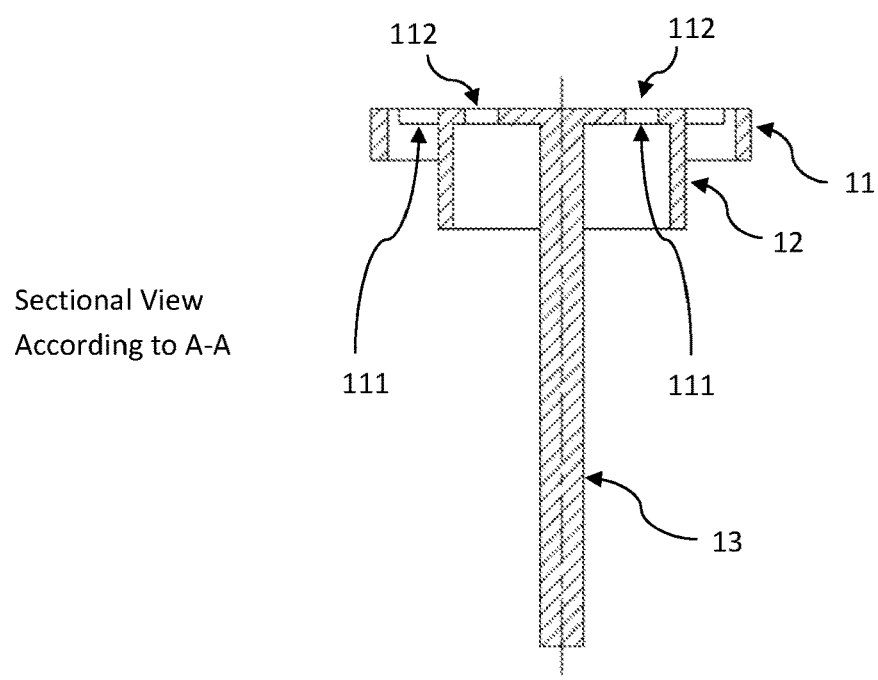
Fig. 5C Bottom View
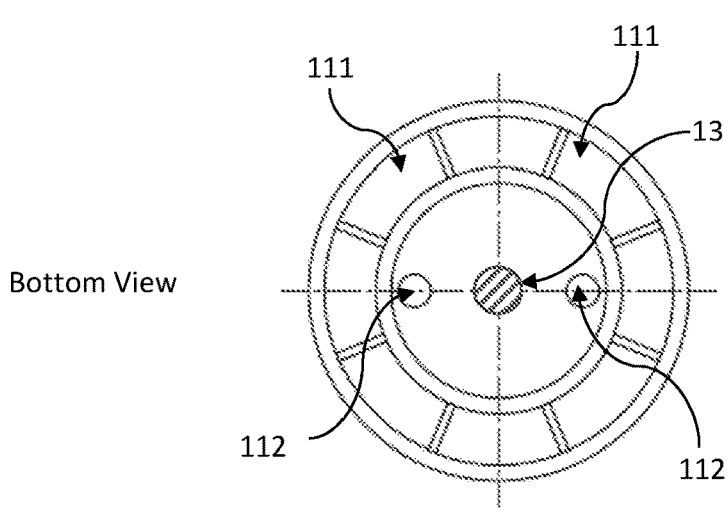

VENTILATION FLOW RATE REGULATOR FOR A PRESSURIZED VEHICLE TANK

TECHNICAL FIELD

The invention relates to vehicle tanks. More precisely, the invention is related to pressurized vehicle tanks provided with a ventilation system.

BACKGROUND

Ventilation of pressurized vehicle tanks, such as fuel tanks, is a known problem which aims at strongly ventilating the pressure tank when certain events occur, as it is the case for hybrid vehicles. For hybrid vehicles, such events are the switch operation between an electric motor mode and a thermal engine mode and the filling of the pressurized tank and even some events (e.g. slosh of fuel) occurring during the driving with thermal engine mode, which make the pressure of the tank too high (generally about 35 kPa).

Commercial solutions for the ventilation of such tanks are ventilation systems which comprises valves for ventilating the pressurized tank when the fuel tank isolation valve (FTIV) is opened, such a FTIV arranged within the ventilation line, downstream of the tank, generally close to the canister. Valves for ventilation may be protective valves such as roll over valves (ROV), which prevent leaks in the event of an overturning of the vehicle or fill limit vent valves (FLVV), which ventilate the tank until the maximum filling volume is reached.

The fuel tank isolation valve (FTIV) is electronically controlled and its opening causes a change of state of the fuel system, formed by the internal volume of the reservoir and by the portion of the internal volume of the ventilation system which is located between the tank and the FTIV. Indeed, the fuel system passes from a closed state to an open state. Because of this opening, a strong depressurization of the fuel system is required. Such a depressurization is characterized by a substantial flow of gas from the reservoir to the canister. In this case, the risk of corking for ventilation valves is high because of the too high flow rate of gas released, mostly from the tank.

Therefore, the corking of such ventilation valves is incompatible with a proper functioning of a hybrid vehicle for which filling operations of the tank or supplying the engine with fuel must take place quickly.

A known solution to solve corking problems of a ventilation valve consists to integrate a regulator of ventilation flow rate within the ventilation line, downstream of the ventilation valve. Such a regulator closes available peripheral paths for the gas flow, by means of a movable member which ends its movement against a stop at the outlet of the regulator. This regulator body maintains a unique central path, thanks to the presence a conduit inside the movable member. However, such a solution keeps the flow rate relatively high once the mobile member abuts against the stop of the regulator body, which does not allow high ventilation performances of the pressurized tank.

It is therefore an object of the invention to provide a regulator which improves the ventilation performances of the pressurized tank, without being complex and expensive.

SUMMARY OF THE INVENTION

The invention relates to a ventilation flow rate regulator for a pressurized vehicle tank, the regulator comprising a plunger adapted to be mounted in a ventilation line, the plunger having at least one peripheral orifice and at least one non-central internal orifice which is closer to an axis of symmetry of the plunger than the peripheral orifice, the non-central internal orifice having a section perpendicular to the axis of symmetry which is smaller than any section of the peripheral orifice perpendicular to the axis of symmetry.

So, when a reservoir isolation valve (FTIV) is opened, the gas leaving the tank comes to the ventilation flow rate regulator of the invention. Such a gas passes through all available orifices, which include the peripheral orifice(s) and the non-central internal orifice(s). By passing through orifices of the plunger, the gas applies a drag force on the plunger which causes movement of the plunger and mechanical actions against means of the regulator for pushing back the plunger to its initial position. Such means for pushing back the plunger can be any known mechanical means, such as a spring or deformable ribs disposed within the ventilation line, which are compressed by the plunger during its movement caused by the drag force of the gas and which push back the plunger to its initial position, when the drag force decreases. When the flow rate of gas rises above a predetermined threshold, the plunger abuts against an abutment in the ventilation line, so that the peripheral path for gas is closed. By doing so, the gas is forced to use the non-central internal orifice, which is smaller than the peripheral orifice. Such a restriction of the available paths for the gas in only one small non-central orifice allows to regulate more precisely the flow rate in the ventilation line and ventilation system. Therefore, it is easy to keep the flow rate of gas leaving the tank below the corking limit of ventilation valves of the ventilation system.

Advantageously, the plunger comprises at least two non-central internal orifices.

So, the gas leaving the tank can pass through more orifices, which makes it easier to distribute such flow of gas. It is possible to have non-central internal orifices with an even smaller section perpendicular to the axis of symmetry than a section of a single non-central internal orifice.

Advantageously, the non-central internal orifices are mutually symmetrical with respect to the axis of symmetry.

So, the distribution of gas leaving the tank is better between the two orifices, which makes it possible to better control the flow of gas and to keep its flow rate below the corking limit of ventilation valves of the ventilation system with more guarantee.

Advantageously, the plunger comprises a plurality of peripheral orifices, preferably eight peripheral orifices.

So, when the flow rate is maintained long enough below the corking limit of the ventilation valves, just after the opening of the reservoir isolation valve, the plunger is brought back, by a return mechanism, to an opening position where gas can flow through by all orifices of the plunger, including the plurality of peripheral orifices which allow a faster complete depressurization of the tank. A plunger with eight peripheral orifices provides good performances of depressurization of the tank.

Advantageously, the plunger comprises a first cylinder of revolution and a second cylinder of revolution which are both cylinders of revolution about the axis of symmetry, the second cylinder of revolution having a smaller radius than a radius of the first cylinder of revolution.

With such a configuration of the plunger, it is possible to have a smaller part which can serve as a contact part with the ventilation line, so that peripheral paths are closed for gas flow, when the flow rate of gas rises above a predetermined threshold. Furthermore, such a configuration also facilitates the coupling and functioning of the plunger with the return mechanism which allows the plunger to return to an opening position, when the flow rate of gas becomes smaller.

Advantageously, the plunger comprises three parts, one of the three parts projecting from another part along the axis of symmetry.

So, the additional part of the plunger, projecting from another part of the plunger, acts as a guiding member for the plunger movements inside the ventilation line. Such movements depend on the drag forces applied by the flow of gas on the plunger, when the gas flows through the regulator.

The invention also relates to a ventilation system for a pressurized vehicle tank comprising a ventilation line and a regulator of the invention.

Advantageously, the ventilation line has an abutment and the plunger is adapted to abut against the abutment when a flow rate of gas leaving the tank rises above a predetermined threshold, so that gas leaving the tank can only flow from a portion of the ventilation line upstream of the regulator, by reference to a direction of gas leaving the tank, to a portion of the ventilation line downstream of the regulator, by reference to the direction of gas leaving the tank, through the non-central internal orifices.

So, the ventilation system is adapted to precisely and more easily limit the flow rate of gas passing through the regulator. Indeed, the abutment of the ventilation line is designed on purpose for contacts with a part of the plunger. These contacts are made on purpose for closing all of the peripheral paths for the gas flow, which means that gas cannot flow through the regulator, from the tank to the canister, by the peripheral orifices. Such a part of the plunger can be the first cylinder of revolution or the second cylinder of revolution.

The invention also relates to a pressurized vehicle tank equipped with a regulator or with a ventilation system of the invention.

BRIEF DESCRIPTION OF THE DRAWINGS

Embodiments of the invention will now be presented through the following figures which illustrate certain practical aspects of the invention. The figures are only shown as examples and do not limit the scope of the present invention.

FIG. 5 shows a schematic representation of the regulator of the present invention without the tank. FIG. 5A shows a top view, FIG. 5B shows a sectional view according to axis A-A, and FIG. 5C shows a bottom view.

DETAILED DESCRIPTION

Figure 1:
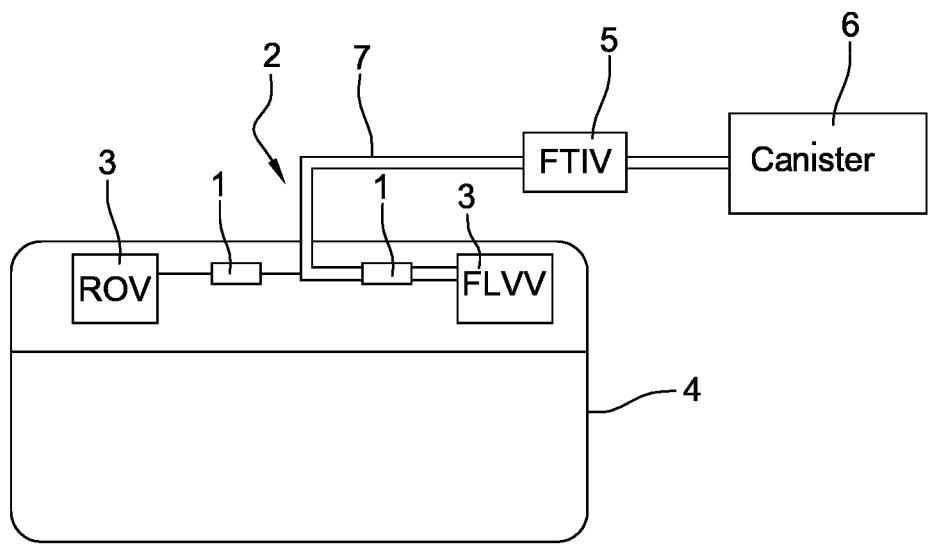
FIG. 1 is a schematic representation of a tank equipped with a ventilation system comprising two regulators according to a first embodiment of the invention.

For a better understanding of the context of the invention, we illustrated in FIG. 1 a pressurized fuel tank 4 of a hybrid vehicle which comprises an electric engine and a thermal engine fed with fuel from this tank, and a ventilation system 2. The ventilation system 2 comprises two regulators 1 according to a first embodiment of the invention. The two engines are not illustrated.

Each one of the ventilation flow rate regulators 1 is arranged within a portion of a ventilation line 7 of the ventilation system 2. Each regulator is positioned downstream of a ventilation valve 3, by reference to a flow of gas leaving the tank 4, as illustrated in FIG. 1.

At the opening of a reservoir isolation valve (FTIV) 5, disposed downstream of these elements within the ventilation system 2 and generally close to a canister 6, when a filling of the tank 4, a switching to the thermal engine mode of the hybrid vehicle (not shown) or a ventilation of the tank 4 during the driving with the thermal engine mode, is required, the gas trapped inside the tank 4 flows through the ventilation line 7 with a strong flow rate. Such a flow of gas leads to a depressurization of the tank 4.

Figure 4:
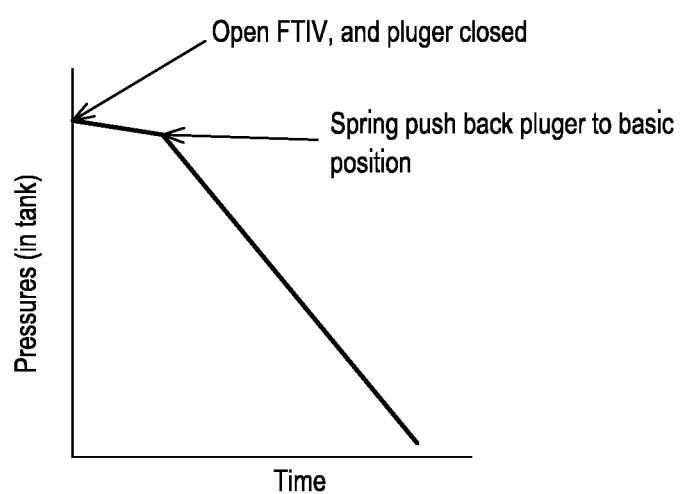
FIG. 4 is a graph representing a pressure/time profile of a ventilation valve equipped with one of the regulators of FIG. 1.

As shown in FIG. 4, the depressurization needs to be controlled, so that the flow rate of gas leaving the tank 4 stays always below the corking limit of the ventilation valve 3. Indeed, it is a requirement of the ventilation system that the flow rate stays below this limit for allowing continuous ventilation of the gas contained in the tank 4.

So, the regulator 1 of the invention makes it possible to precisely regulate the flow rate of gas leaving the tank 4 and allows to avoid corking of the ventilation valve 3 with which the regulator 4 is associated. In such a case, ventilation valves 3 can be roll over valves (ROV) or fill limit vent valves (FLVV).

To do so, each regulator 1 comprises a plunger 10 with an axis of revolution, this plunger 10 being adapted to be mounted in a ventilation line 7. The plunger 10 comprises a first cylinder of revolution 11, a second cylinder of revolution 12 and a third part 13 projecting from the second cylinder of revolution 12 along the axis of revolution A.

The regulator 1 is also provided with mechanical means for pushing back the plunger. In this embodiment, such means are in the form of a spring 9 which is compressed when gas applies too high a drag force on the plunger 10, which occurs when a flow rate of gas leaving the tank 4 rises above a predetermined threshold. Spring 9 also provides a spring force that allows pushing back of the plunger 10 to its initial open position, when the flow rate of gas becomes smaller that the predetermined threshold. In other non-illustrated embodiments, means for pushing back the plunger can be any other suitable and known mechanical means.

Figure 2:
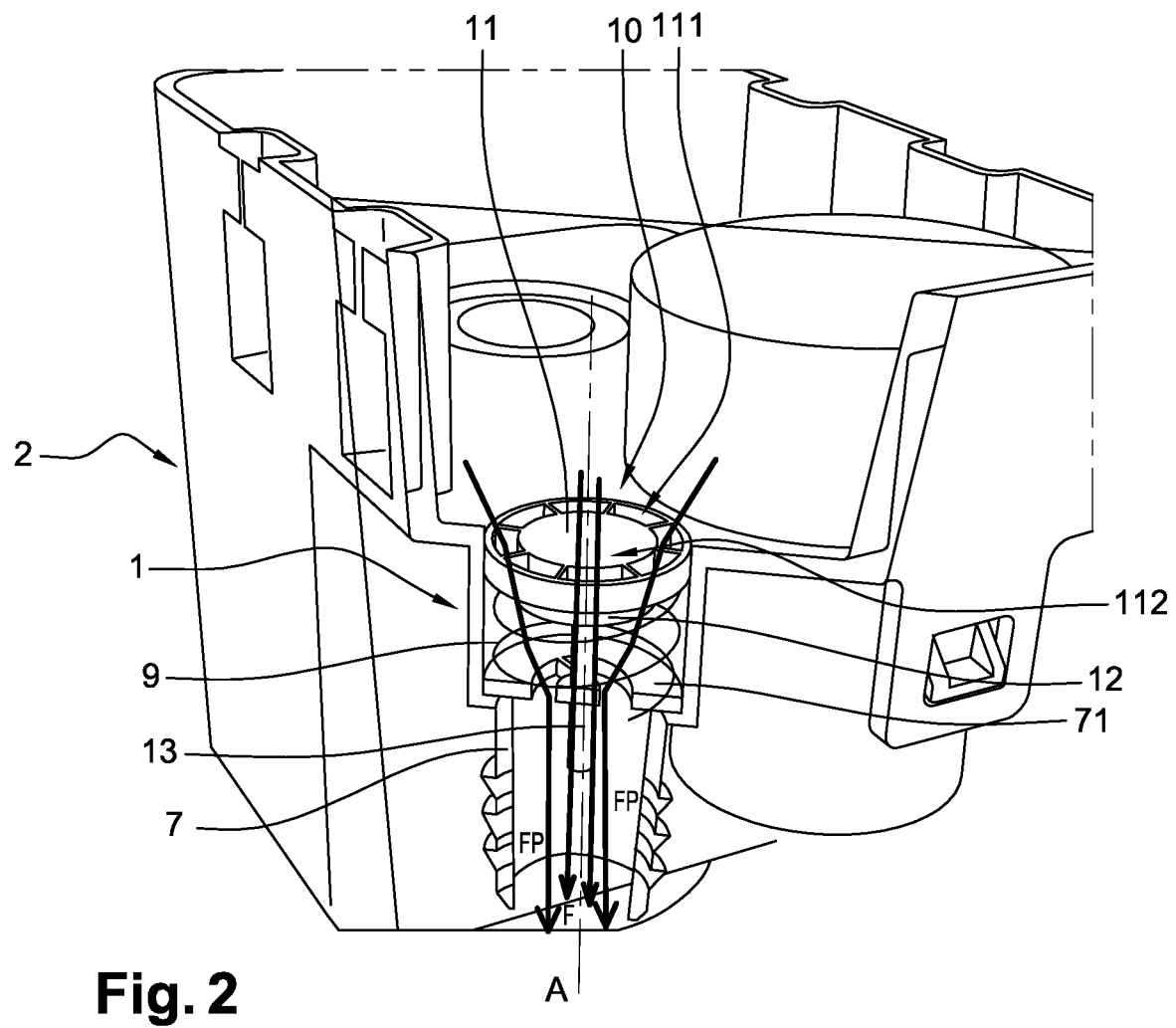
FIG. 2 and FIG. 3 are perspective views of one of the regulators of FIG. 1.
Figure 3:
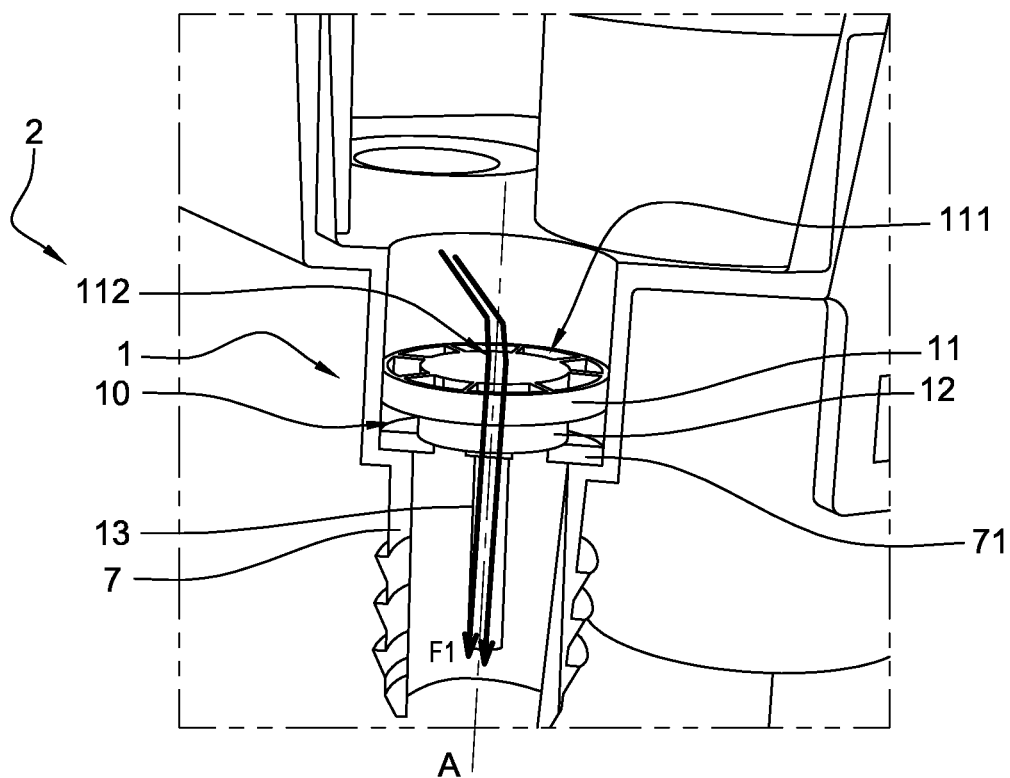

The first cylinder 11 has eight peripheral orifices 111, that allow a large flow rate in normal pressure condition and two non-central internal orifices 112 that allow a lower flow rate in high pressure condition. Such flow paths are illustrated in FIG. 2 and FIG. 3 by arrows FP for gas flow passing through peripheral orifices and by arrows Fl for gas flow passing through non-central internal orifices 112. The peripheral orifices are arranged in a ring like configuration, in this embodiment but other configurations are possible. In this embodiment, each non-central internal orifice 112 has a cylindrical shape with a circular section. It is of lower section than any section of the peripheral orifices 111. The sections which are considered here are all taken in a plane perpendicular to the axis of symmetry.

The second cylinder of revolution 12, which has a smaller radius than a radius of the first cylinders of revolution 11, allows contacts with an abutment 71 of the ventilation line 7 and closure of the peripheral flow paths, when the flow rate of gas leaving the tank 4 rises above a predetermined threshold. In this situation, illustrated in FIG. 3, the spring 9 is compressed at the maximum because of the drag force of the flow of gas which applies on the first cylinders of revolution 11.

In another embodiment of the invention, which is not represented, the first cylinder of revolution 11 of the plunger 10 is designed to directly abut against an abutment 71 of the ventilation line 7.

The regulator 1 and ventilation system 2 of the invention work as follows.

When a switch operation between an electric motor mode and a thermal engine mode or when a filling of the pressurized tank 4 is required, such an event is automatically detected and the reservoir isolation valve (FTIV) 5 is electronically open by a controller (not represented).

Then, a large quantity of gas contained in the tank 4 is released because of the pressure difference between the high pressure inside the tank 4 and the pressure of the vehicle system after the canister 6. A strong depressurization is required to ensure that regular operations of the tank 4 equipped with the ventilation system 2 are performed properly, such as supplying the engine with fuel.

As shown in FIG. 4, the strong flow rate of the released gas causes the compression of the spring 9 by the first cylinder of revolution 11 of the plunger 10. In this position of the plunger 10, the gas can only pass through the non-central internal orifices 112, with the effect of a low and slow pressure drop, at the first moments that follow the opening of the FTIV 5. Such a low and slow pressure drop allows to keep the flow rate of gas inside the ventilation system 2 below the corking limit of the ventilation valves 3.

When the pressure has dropped sufficiently so that the flow of gas released from the tank 4 is no longer likely to cause a corking of the ventilation valves 3, the spring 9 is able to push the plunger 10 back to a large open position, in which the gas passes through both the peripheral openings 111 and the non-central internal orifices 112. As a result, the pressure inside the tank 4 quickly drops to the atmospheric pressure.

The invention is not limited to the above embodiments and other embodiments exist and will appear clearly to one skilled in the art.

The invention claimed is:

1. A ventilation flow rate regulator,
    the ventilation flow rate regulator comprising a plunger adapted to be mounted in a ventilation line,
    the plunger having at least one peripheral orifice and at least one non-central internal orifice which is closer to an axis of symmetry of the plunger than the peripheral orifice,
    the non-central internal orifice having a section perpendicular to the axis of symmetry which is smaller than any section of the peripheral orifice perpendicular to the axis of symmetry,
    wherein the plunger comprises a first cylinder of revolution, a second cylinder of revolution and a third cylinder of revolution which are all cylinders of revolution about the axis of symmetry, the second cylinder of revolution having a smaller radius than a radius of the first cylinder of revolution and the third cylinder of revolution having a smaller radius than a radius of the second cylinder of revolution, wherein the third cylinder of revolution projects from the second cylinder of revolution along the axis of symmetry,
    wherein the second cylinder of revolution projects from the first cylinder of revolution along the axis of symmetry and is adapted to abut against an abutment of the ventilation line so that the flow can only flow through the non-central internal orifice.

2. The ventilation flow rate regulator according to claim 1, wherein the plunger comprises at least two non-central internal orifices.

3. The ventilation flow rate regulator according to claim 2, wherein the non-central internal orifices are mutually symmetrical with respect to the axis of symmetry.

4. The ventilation flow rate regulator according to claim 1, wherein the plunger comprises a plurality of peripheral orifices.

5. A ventilation system comprising the ventilation line and the ventilation flow rate regulator according to claim 1.

6. The ventilation system according to claim 5, wherein the ventilation line has an abutment and the plunger is adapted to abut against the abutment when a flow rate of gas leaving the tank rises above a predetermined threshold, so that gas leaving the tank can only flow from a portion of the ventilation line upstream of the ventilation flow rate regulator, by reference to a direction of gas leaving the tank, to a portion of the ventilation line downstream of the ventilation flow rate regulator, by reference to the direction of gas leaving the tank, through the non-central internal orifices.

7. The ventilation system according to claim 5, comprising at least one ventilation valve, wherein the ventilation flow rate regulator is arranged downstream of the ventilation valve, by reference to a direction of gas leaving the tank.

8. A pressurized vehicle tank, equipped with the ventilation flow rate regulator according to claim 1.

9. The ventilation flow rate regulator according to claim 1, wherein the plunger comprises eight peripheral orifices.

10. The ventilation system according to claim 6, comprising at least one ventilation valve, wherein the ventilation flow rate regulator is arranged downstream of the ventilation valve, by reference to a direction of gas leaving the tank.

11. A pressurized vehicle tank, equipped with the ventilation system according to claim 5.

12. The ventilation system according to claim 6, wherein the second cylinder of revolution of said plunger abuts the abutment.

13. The ventilation system according to claim 12, wherein the third cylinder of revolution of said plunger projects into the ventilation line.

* * * * *